(12) United States Patent
Furuya

(10) Patent No.: US 8,402,235 B2
(45) Date of Patent: Mar. 19, 2013

(54) BACKUP APPARATUS, BACKUP METHOD AND BACKUP PROGRAM

(75) Inventor: Masanori Furuya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 12/622,135

(22) Filed: Nov. 19, 2009

(65) Prior Publication Data

US 2010/0138622 A1 Jun. 3, 2010

(30) Foreign Application Priority Data

Dec. 3, 2008 (JP) ................................ 2008-309094

(51) Int. Cl.
*G06F 12/00* (2006.01)

(52) U.S. Cl. ....................... 711/162; 711/202
(58) Field of Classification Search ................. 711/162, 711/202
See application file for complete search history.

(56) References Cited

U.S. PATENT DOCUMENTS

| | | | | |
|---|---|---|---|---|
| 7,133,987 B2 * | 11/2006 | Watanabe et al. | ............. | 711/162 |
| 7,721,056 B2 * | 5/2010 | Wake | ............. | 711/162 |
| 2005/0144517 A1 * | 6/2005 | Zayas | ............. | 714/8 |
| 2005/0223154 A1 | 10/2005 | Uemura | | |
| 2006/0212674 A1 * | 9/2006 | Chung et al. | ............. | 711/202 |
| 2009/0244754 A1 * | 10/2009 | Sato | ............. | 360/31 |

FOREIGN PATENT DOCUMENTS

| | | |
|---|---|---|
| JP | 2005-293774 | 10/2005 |
| JP | 2006-221636 | 8/2006 |

* cited by examiner

*Primary Examiner* — Hashem Farrokh
(74) *Attorney, Agent, or Firm* — Fujitsu Patent Center

(57) ABSTRACT

A backup apparatus has an address conversion table for storing, in correspondence with each other, a logical address and a physical address. The backup apparatus has a sequential data count setting unit, a sequential data information acquisition unit, and a reading unit. The sequential data count setting unit sets sequential data count information indicating the number of data blocks in a sequence in the physical address in the address conversion table. The sequential data information acquisition unit, upon receiving a read request, reads the data block in the address conversion table corresponding to the leading logical address among the logical addresses requested to be read and acquires the sequential data count information set in the address conversion table. The reading unit reads a physical volume corresponding to physical addresses in a sequence in accordance with the sequential data count information acquired by the sequential data information acquisition unit.

9 Claims, 10 Drawing Sheets

FIG. 2

| 7 | 6 | | 5 | 4 | 3 | 2 | 1 | 0 |
|---|---|---|---|---|---|---|---|---|
| Level | MOST SIGNIFICANT 2 BITS | LEAST SIGNIFICANT 6 BITS | SLBA (Max 32PB) | | | | | |
| | Flag | Count | | | | | | |

BACKUP APPARATUS, BACKUP METHOD AND BACKUP PROGRAM

CROSS-REFERENCE TO RELATED APPLICATIONS

This application is based upon and claims the benefit of priority of the prior Japanese Patent Application No. 2008-309094, filed on Dec. 3, 2008, the entire contents of which are incorporated herein by reference.

FIELD

The embodiments discussed herein are related to a backup apparatus, a backup method, and a backup program for converting a logical block address) to a physical block address using a LBA (Logical Block Address) conversion table.

BACKGROUND

As one of the conventional techniques for backing up a copy source volume of a storage product or a computer, an OPC (One Point Copy) technique is known. When backing up data, the OPC technique makes a snapshot of the data existing at a predetermined time without the subsequent updates, etc. Specifically, the OPC technique is a technique to back up all the data of the copy source volume involved at the time of generating a backup.

The backup apparatus for executing the OPC technique, for example, upon receiving an OPC command from the user to produce an OPC, copies all the data of the copy source volume at the point in time when the OPC command is received. The backup apparatus stores the copied data (backup data) as a snapshot at the time point of receiving the OPC command. Specifically, the backup apparatus stores the backup data as a copy of the whole copy source volume in correspondence with the time point of receiving the OPC command and a generation (session information).

A technique called "SnapOPC" is known as an advanced function of the OPC technique described above. The SnapOPC technique is a technique for backing up only the data that is generated before the update in the part of the data of the copy source volume which will be updated.

According to the SnapOPC technique, a physical volume smaller in capacity than the copy source volume is acquired as a copy destination volume to which the data is actually copied. As a result, the capacity required for the copy destination can be reduced. In order to make it possible for a host to access a copy destination volume in a similar way to a copy source volume on the other hand, the host recognizes a logical volume having the same capacity as the copy source volume. The LBA of the physical volume is referred to as a physical LBA, and the LBA of the logical volume is referred to as a logical LBA.

According to the SnapOPC technique, as depicted in FIG. 9, the physical LBA and the logical LBA are defined for the copy destination volume. The copy destination volume for SnapOPC is referred to as the "Snap Data Volume" (SDV). Also, in the copy destination volume, the LBA visible to the host is referred to as a logical LBA, and the LBA physically constructed is referred to as a physical LBA. The logical capacity of the copy destination is equal to that of the copy source.

In a backup apparatus carrying out the SnapOPC technique, a copy session is set and host I/O processing is executed with the logical LBA, and data is recorded as a physical LBA in the SDV on a first-come-first-served basis.

At this time, an area for the LBA conversion table to convert the logical LBA to the physical LBA is secured in the SDV (see FIG. 10). The LBA conversion table holds the entries, which are in data units generated during the copy operation, in an amount equal to the logical capacity. Assume, for example, that 1 LBA unit (data block) is 512 bytes and 16 LBAs are managed as one entry. Then, the LBA conversion table holds the number of entries equal to the total number of logical LBAs divided by 16. The backup apparatus carrying out the SnapOPC technique is adapted to acquire the start address of the physical LBA having the length of 16 LBAs from the corresponding logical LBA.

The backup apparatus, upon receiving an I/O request from the host, reads the LBA conversion table for all the I/Os in one read operation. In the case where the physical LBAs are sequential, the read/write operation is performed collectively. In this case, during the read operation of the LBA conversion table, other data accesses to the particular LBA range are excluded. In the case where an I/O accessing the same area occurs, therefore, waiting for the exclusion occurs and exclusion waiting time is generated (see FIG. 11).

In the conventional technique described above, a plurality of entries are read from the LBA conversion table for one I/O operation, and therefore, there is a problem in that waiting for the exclusion of other data accesses to the LBA conversion table frequently occurs.

SUMMARY

According to an aspect of the invention, a backup apparatus includes an address conversion table for storing, in correspondence with each other, a logical address designated by a host system and a physical address indicating a data storage position in a copy destination volume. The backup apparatus has a sequential data count setting unit, a sequential data information acquisition unit, and a reading unit. The sequential data count setting unit sets sequential data count information indicating the number of data blocks in a sequence in the physical address in the address conversion table. The sequential data information acquisition unit, upon receiving a read request, reads the data block in the address conversion table corresponding to the leading logical address among the logical addresses requested to be read, and acquires the sequential data count information set in the address conversion table. The reading unit reads a physical volume corresponding to physical addresses in a sequence in accordance with the sequential data count information acquired by the sequential data information acquisition unit.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 2 is a diagram for explaining the LBA table format for SDV;

DESCRIPTION OF EMBODIMENTS

A backup apparatus, a backup method, and a backup program according to embodiments of the invention are explained below with reference to the accompanying drawings.

Embodiment 1

The configuration and the process flow of the backup apparatus according to a first embodiment are explained in order below followed by a description of the effects of the first embodiment.

[Configuration of Backup Apparatus]

Figure 1:
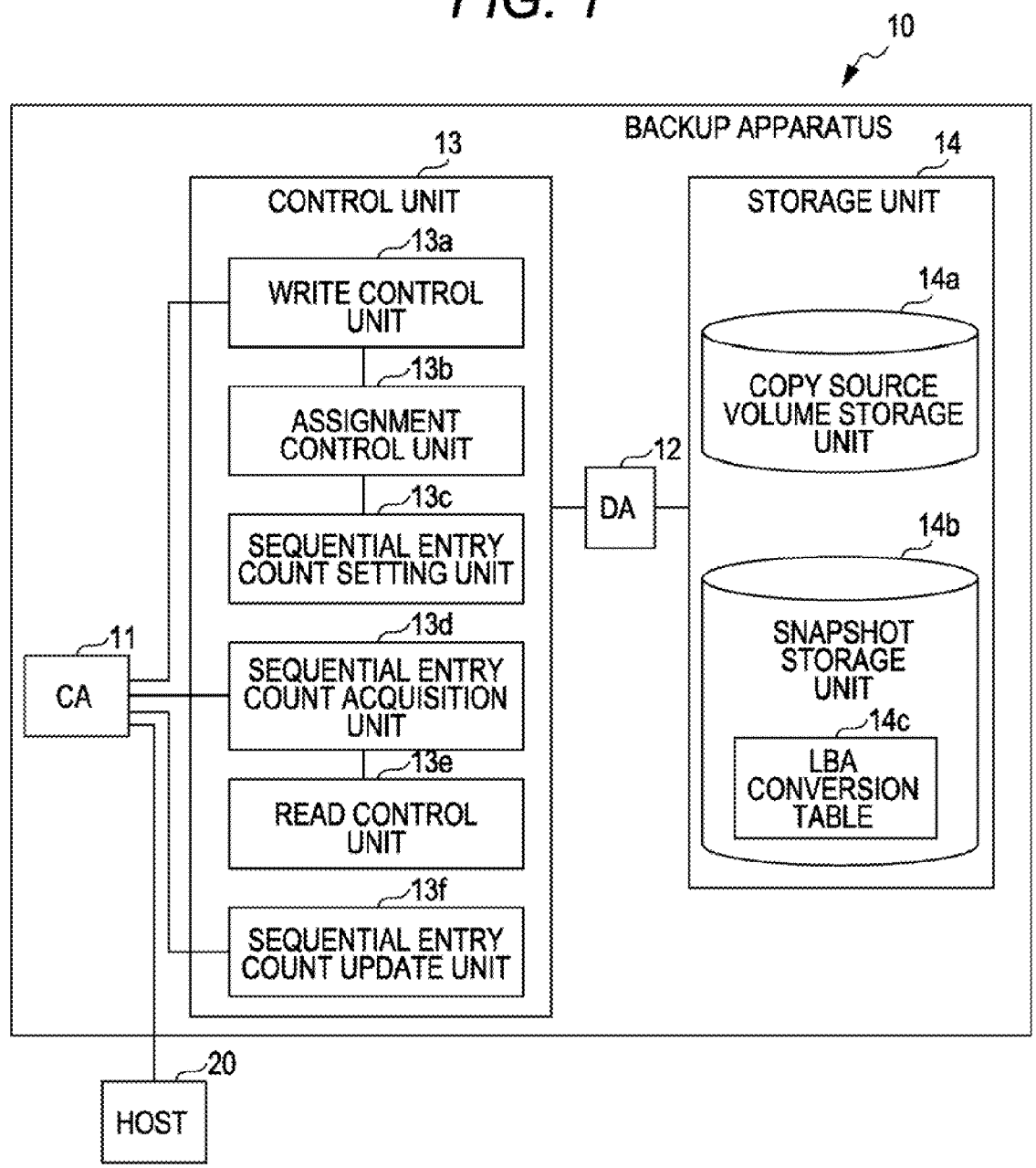
FIG. 1 is a block diagram of the configuration of a backup apparatus according to a first embodiment.
Figure 3:
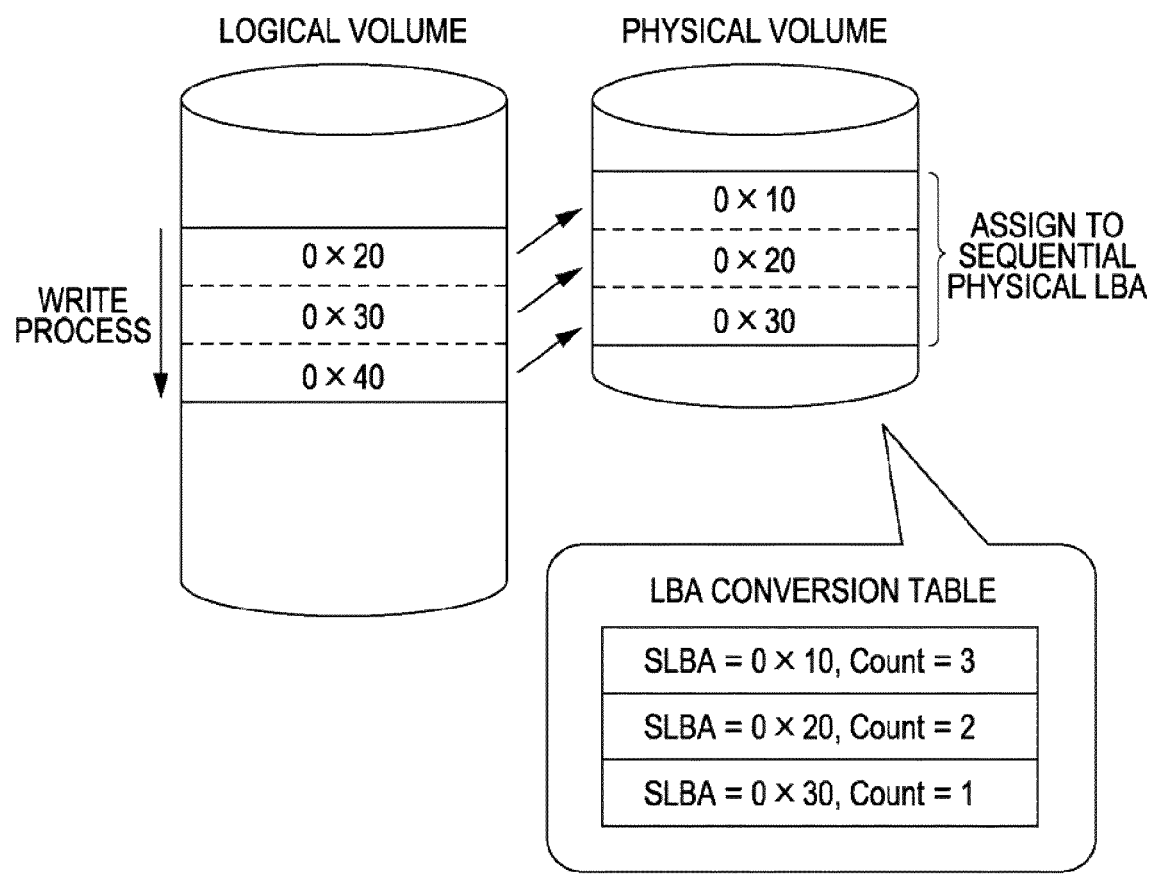
FIG. 3 is a diagram for explaining the sequential entry count.
Figure 4:
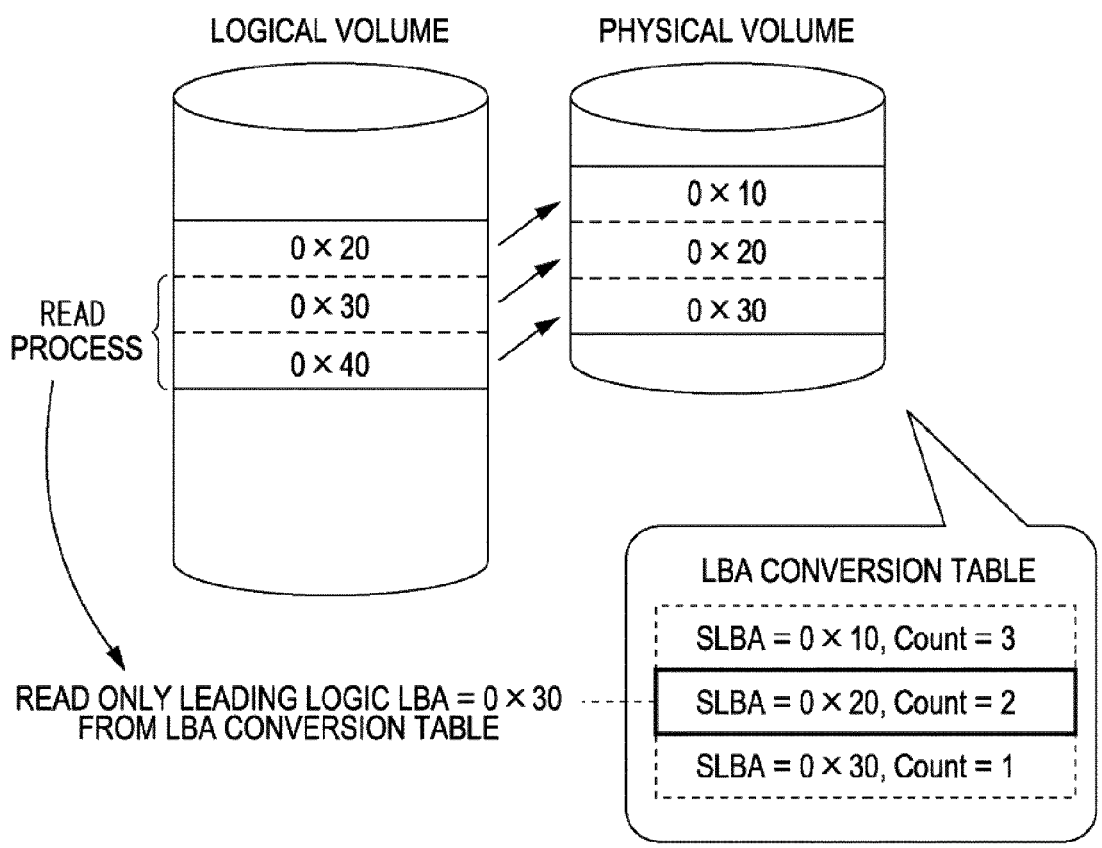
FIG. 4 is a diagram for explaining the process of reading the LBA conversion table.
Figure 5:
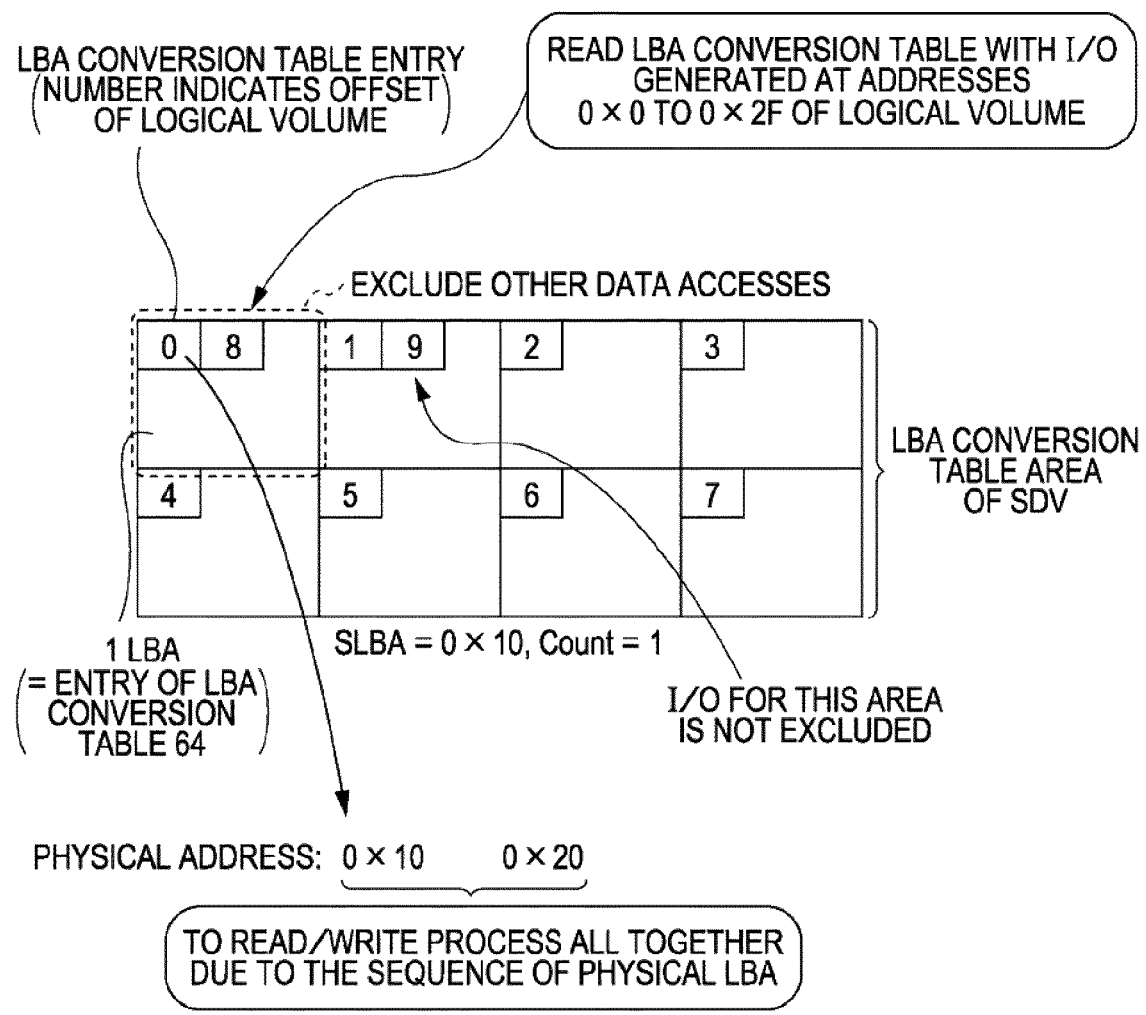
FIG. 5 is a diagram for explaining the effect of the process of reading the LBA conversion table.
Figure 6:
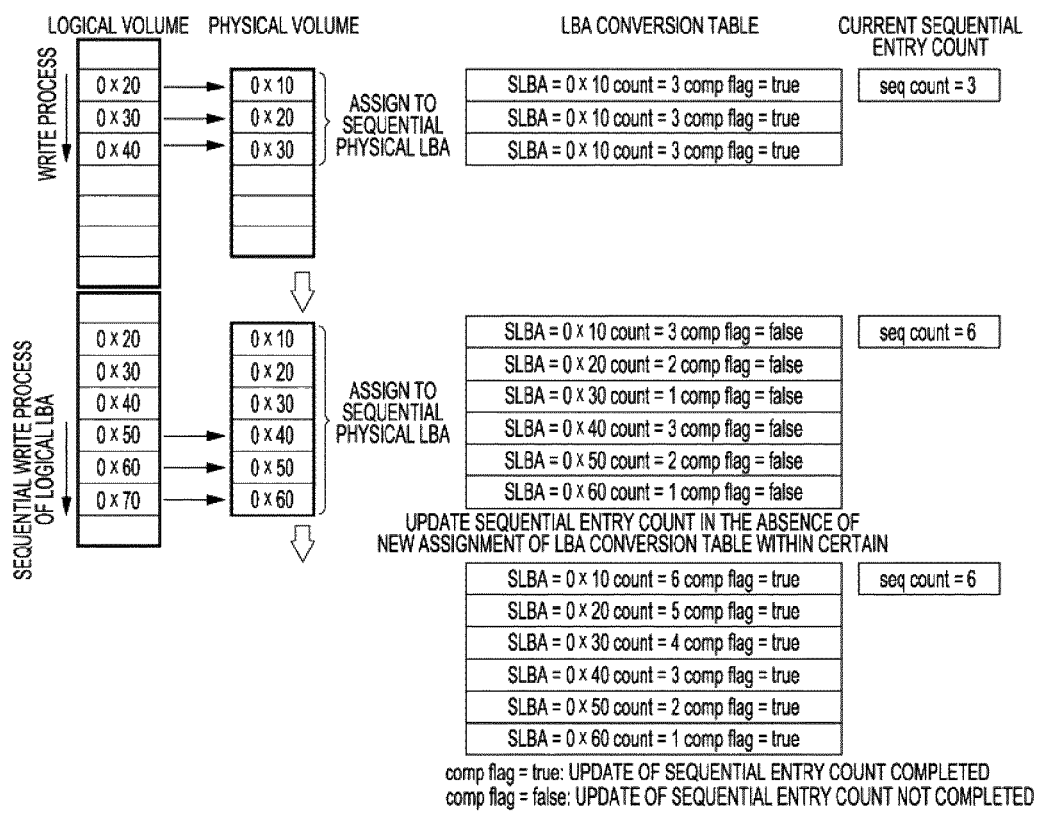
FIG. 6 is a diagram for explaining the process of updating the sequential entry count.

With reference to FIGS. 1 to 6, the configuration of the backup apparatus 10 is explained. FIG. 1 is a block diagram illustrating the configuration of the backup apparatus according to the first embodiment. FIG. 2 is a diagram for explaining the LBA table format for SDV. FIG. 3 is a diagram for explaining the sequential entry count. FIG. 4 is a diagram for explaining the process of reading the LBA conversion table. FIG. 5 is a diagram for explaining the effect of the process of reading the LBA conversion table. FIG. 6 is a diagram for explaining the process of updating the sequential entry count.

As illustrated in FIG. 1, the backup apparatus 10 includes a CA (Channel Adapter) 11, a DA (Disk Adapter) 12, a control unit 13, and a storage unit 14, and is connected to a host 20 through the CA 11. The process executed in each of these component parts is explained below.

The host 20 is a device manipulated by an operator. For example, a computer terminal used by the user to manage the backup apparatus 10 is the host 20. A command to generate a snapshot is transmitted from the host 20 to the backup apparatus 10 through the CA 11.

The CA 11 is an I/F control unit for the host 20. The CA 11 controls the transmission and reception of information to and from the host 20. The CA 11 controls the process of receiving a write request and a read request (I/O request) and a command from the host 20 to generate a snapshot. Also, the CA 11 controls the process of transmitting the responses to these requests and commands to the host 20.

The DA 12 is an I/F control unit for a disk. The DA 12 controls the transmission and reception of information between the control unit 13 and the storage unit 14. For example, the DA 12 controls the operation of reading the data stored in the storage unit 14. Also, the DA 12 controls the process of setting and updating a sequential entry count in an LBA conversion table 14c.

The storage unit 14 is a storage medium for storing the data desired for the backup process, and includes a copy source volume storage unit 14a and a snapshot storage unit 14b. Also, the snapshot storage unit 14b has the LBA conversion table 14c therein.

The copy source volume storage unit 14a stores the copy source volume to be backed up. The invention is not limited to the case in which the copy source volume to be backed up is stored in the copy source volume storage unit 14a in the backup apparatus 10. As an alternative, for example, the backup apparatus 10 may be connected through a network to a storage device for storing the copy source volume.

The snapshot storage unit 14b stores a snapshot indicating the source data at the time point when the backup is executed. The snapshot data stored in the snapshot storage unit 14b is read by a read control unit 13e described later. Also, the snapshot data stored in the snapshot storage unit 14b may be changed by a write control unit 13a described later.

The LBA conversion table 14c is a table of logical addresses and physical addresses associated with each other when a snapshot is generated. The logical address indicates a location of the data in the copy source volume. The physical address indicates a location in the snapshot storage unit 14b where the data corresponding to a certain logical address is stored. As illustrated in FIG. 2, the LBA conversion table 14c stores the sequential entry count (described as "count" in FIG. 2) which is the information on the sequentiality of the physical LBA.

The sequential entry count indicates that the physical LBAs of the entries counted from a particular entry make up a sequence. The backup apparatus 10 sets the sequential entry count when a new assignment of the LBA conversion table 14c occurs in the write process (described in detail later with reference to FIG. 3). The sequential entry count is set also for assignments to the LBA conversion table 14c in the process of writing into the copy source volume, as well as in the process of writing into the copy destination volume described below.

The control unit 13 includes an internal memory for storing the desired data and programs specifying various processing steps, etc. The control unit 13 executes various processes using the programs and the desired data. The control unit 13 includes the write control unit 13a, an assignment control unit 13b, a sequential entry count setting unit 13c, a sequential entry count acquisition unit 13d, the read control unit 13e, and a sequential entry count update unit 13f. As described in detail below, the control unit 13 stores, in a memory (not shown), the logical LBA last assigned to the LBA conversion table 14c, the continuing sequential entry count indicating the number of entries from the detection of a sequence up to the present time point, and an update process completion flag indicating whether the update process has been executed or not.

The write control unit 13a, upon reception of a request (I/O request) from the host 20 to change the copy source volume, updates the copy source volume. Then, the write control unit 13a informs the host 20, after execution of the update process, that the update process has been executed. Also, the write control unit 13a stores, in the snapshot storage unit 14b, the source data immediately before the update corresponding to the updated location.

The assignment control unit 13b, upon receiving a command to carry out a backup operation, assigns a storage area to store the snapshot generated in accordance with the command. The assignment control unit 13b, upon execution of the update process (write process) of the copy source volume by the write control unit 13a, makes a new assignment to the LBA conversion table 14c of the copy source volume and notifies the sequential entry count setting unit 13c that the new assignment is effected.

The sequential entry count setting unit 13c, as illustrated in FIG. 3, sets the sequential entry count information indicating the number of sequential entries of the physical LBA in the LBA conversion table 14c. For example, the sequential entry count setting unit 13c, as illustrated in FIG. 3, sets the "count" which is the sequential entry count information when the sequential physical LBAs are assigned to the logical LBAs 0x20 to 0x40 at the time of executing the copy process during the write process.

In other words, the sequential entry count setting unit 13c determines whether the logical LBA last assigned is in a sequence with the logical LBA presently assigned to the LBA conversion table 14c or not. If the logical LBA last assigned is in a sequence with the logical LBA presently assigned to the LBA conversion table 14c, the sequential entry count setting unit 13c sets the sequential entry count information as a sequence of the physical LBA corresponding to the logical LBA last assigned and the physical LBA corresponding to the logical LBA presently assigned to the LBA address conversion table.

This process is explained in more detail. The sequential entry count setting unit 13c, upon reception of a notice from the assignment control unit 13b that a new assignment is to be carried out, determines whether the last assigned logical LBA makes up a sequence with the logical LBA presently assigned to the LBA conversion table 14c or not.

If the last assigned logical LBA makes up a sequence with the logical LBA presently assigned to the LBA conversion table 14c, the sequential entry count setting unit 13c increments the continuing sequential entry count held in the memory. Also, since the update process may occur again, the update process completion flag is set to false by the sequential entry count setting unit 13c.

If the last assigned logical LBA does not make up a sequence with the logical LBA presently assigned to the LBA conversion table 14c on the other hand, the sequential entry count setting unit 13c determines whether the update process completion flag is false or not.

If the update process completion flag is false, the sequential entry count setting unit 13c calculates the entire sequential entry in LBA conversion table 14c from the current sequential entry count and the present logical LBA and updates the sequential entry count. Next, the sequential entry count setting unit 13c sets the update process completion flag to true.

The sequential entry count acquisition unit 13d, upon receiving a read request (I/O request) from the host 20, as illustrated in FIG. 4, reads the entry of the LBA conversion table 14c corresponding to the leading logical LBA among the logical LBAs requested to be read. Also, the sequential entry count acquisition unit 13d acquires the sequential entry count information (the count "2" in FIG. 4) set in the entry of the LBA conversion table 14c. After that, the sequential entry count acquisition unit 13d notifies the read control unit 13e of the count value which is the acquired sequential entry count information.

The read control unit 13e reads the physical volume corresponding to the sequential physical LBA in accordance with the sequential entry count information acquired. The read control unit 13e, upon reception of the count value which is the sequential entry count information from the sequential entry count acquisition unit 13d, reads the physical volume of the physical LBAs corresponding to the count value.

As illustrated in FIG. 5, because the backup apparatus 10 selects only one entry from the LBA conversion table 14c entries corresponding to the leading logical LBA as the entry to be read, as a result of the I/O of other areas not being excluded, data access times and waiting for exclusion in data access may be reduced.

Also, in response to a request to read the area for which the process of updating the sequential entry count is yet to be completed, the read control unit 13e executes the process as a sequence up to the logical LBA last assigned to the LBA conversion table 14c.

Thus, based on the logical LBA last assigned to the LBA conversion table 14c and the continuing sequential entry count, the read control unit 13e determines whether the starting LBA that received an I/O is included or not in the range yet to be updated. Upon determination that the starting LBA is included in the range yet to be updated, the read control unit 13e reads only one entry of the LBA conversion table 14c corresponding to the starting LBA that received an I/O. The read control unit 13e reads the physical volume as a sequence from the starting LBA to the logical LBA last assigned to the LBA conversion table 14c.

If a new assignment of the LBA conversion table 14c does not occur within a certain time, the sequential entry count update unit 13f executes the sequential entry count update process. In other words, if a new assignment of the LBA conversion table 14c does not occur within a certain time, the sequential entry count update unit 13f updates the count of the sequential LBA conversion table 14c in a range stretching back by the amount of the continuing sequential entry count.

An explanation is given with reference to a specific example. As illustrated in FIG. 6, if a new assignment of the LBA conversion table 14c does not occur within a certain time, the sequential entry count update unit 13f determines whether the logical LBA last assigned to the LBA conversion table 14c in the previous session (0x40 in FIG. 6) makes up a sequence with the leading logical LBA (0x50 in FIG. 6) or not. Upon determination that the logical LBA last assigned to the LBA conversion table 14c in the previous session makes up a sequence with the leading logical LBA, the sequential entry count update unit 13f executes the sequential entry count update process to update the counts.

[Processing by Backup Apparatus]

Figure 7:
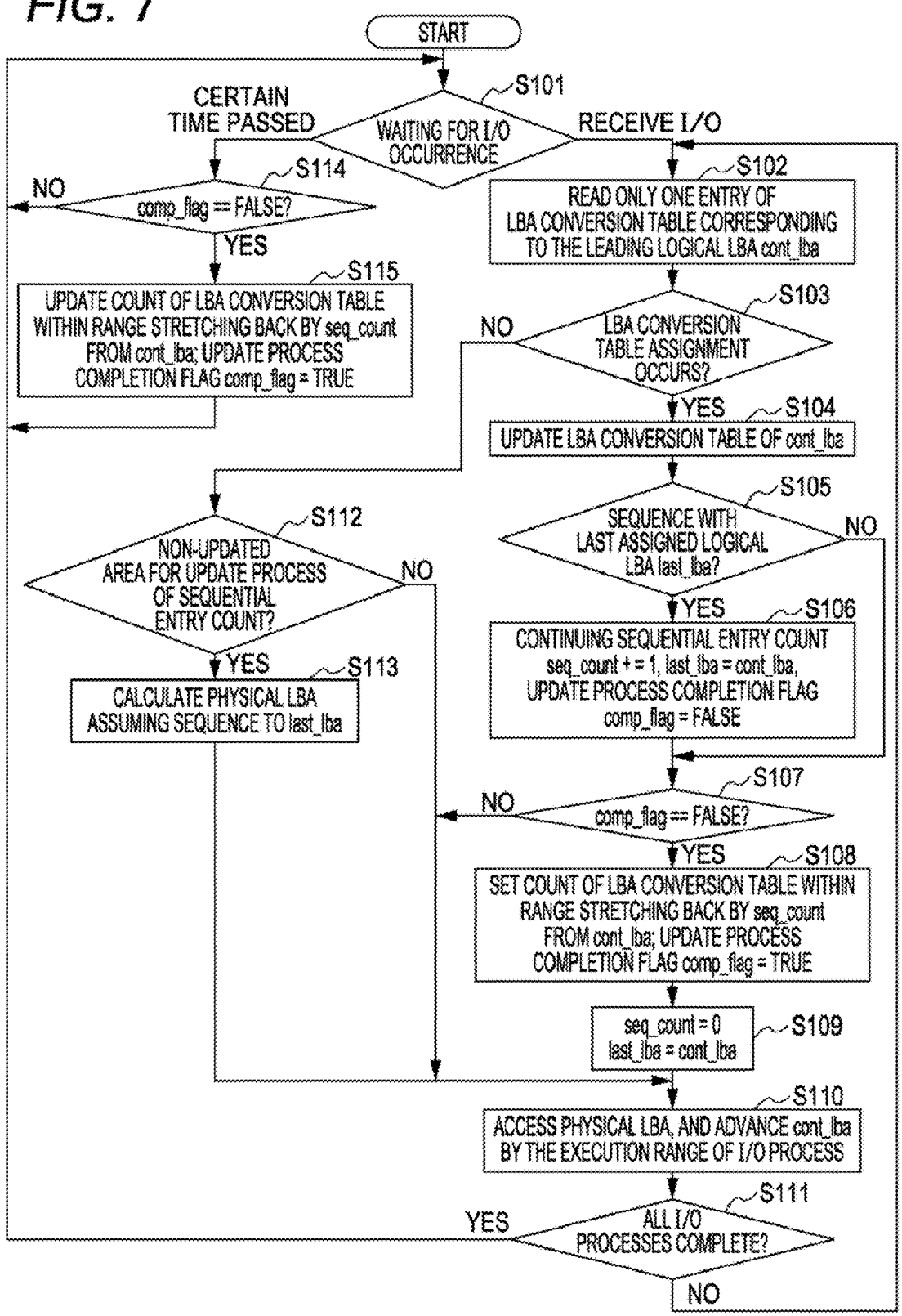
FIG. 7 is a flowchart for explaining the processing steps of the backup apparatus according to the first embodiment.

Next, the process executed by the backup apparatus 10 according to the first embodiment is explained with reference to FIG. 7. FIG. 7 is a flowchart illustrating the processing operation of the backup apparatus 10 according to the first embodiment.

As illustrated in FIG. 7, the backup apparatus 10 waits for I/O occurrence (step S101) and, upon receiving an I/O request, reads only one entry of the LBA conversion table 14c corresponding to the leading logical LBA (step S102) and determines whether the new assignment of the LBA conversion table 14c occurs or not (step S103).

If the new assignment of the LBA conversion table 14c occurs (YES in step S103), the backup apparatus 10 updates the LBA conversion table 14c by assigning the physical LBA to the leading logical LBA (step S104). Next, the backup apparatus 10 determines whether the last assigned logical LBA makes up a sequence with the logical LBA presently assigned to the LBA conversion table 14c or not (step S105).

If the last assigned logical LBA makes up a sequence with the logical LBA presently assigned to the LBA conversion table 14c (YES in step S105), the backup apparatus 10 increments the continuing sequential entry count and sets the update process completion flag to false for executing the update process again (step S106).

If the last assigned logical LBA does not make up a sequence with the logical LBA presently assigned to the LBA conversion table 14c (NO in step S105) on the other hand, the backup apparatus 10 determines whether the update process completion flag is set to false or not (step S107).

If the update process completion flag is set to false (YES in step S107), the backup apparatus 10 reads all the sequential LBA conversion tables 14c calculated from the continuing sequential entry count and the present logical LBA and then executes the process of setting the sequential entry counts, while at the same time setting the update process completion flag to true (step S108).

Then, the backup apparatus 10 clears the continuing sequential entry count, and holds the logical LBA last assigned the LBA conversion table 14c in the memory (step S109). After that, the backup apparatus 10 accesses the physical LBAs and, executes the I/O processes, and stores the logical LBAs of the range in which the I/O processes are executed (step S110).

After that, the backup apparatus 10 determines whether all the I/O processes are completed or not (step S111), and if all the I/O processes are not completed (NO in step S111), returns to step S102 and repeats the process described above. If all the I/O processes are completed (YES in step S111) on the other hand, the backup apparatus 10 returns to step S101 to repeat the same process.

Now, the explanation returns to step S103. If no new assignment of the LBA conversion table 14c occurs (NO in step S103), the backup apparatus 10 determines whether the I/O corresponds to the area in which the update process of the sequential entry count is not completed or not (step S112). If the I/O does not correspond to the area in which the update process of the sequential entry count is not completed (NO in step S112), the backup apparatus 10 accesses the physical LBAs, executes the I/O processes, and stores the logical LBAs for the range in which the I/O processes are executed (step S110).

If the I/O corresponds to the area in which the process of updating the sequential entry count is not completed (YES in step S112) on the other hand, the backup apparatus 10 executes the process as a sequence up to the logical LBA last assigned to the LBA conversion table 14c (step S113).

Based on the continuing sequential entry count and the logical LBA last assigned to the LBA conversion table 14c, the backup apparatus 10 determines whether the starting LBA for which the I/O is received is included or not in the range yet to be updated. Upon determination that the starting LBA with the received I/O is included in the range yet to be updated, the backup apparatus 10 stages, by one entry, the LBA conversion table 14c corresponding to the starting LBA with the received I/O, and calculates the physical LBA as a sequence of the LBA range from the particular LBA to the logical LBA last assigned to the LBA conversion table 14c.

Now, the explanation returns to step S101. If no new assignment of the LBA conversion table 14c occurs within a certain time, the backup apparatus 10 determines whether the update process completion flag is set to false or not (step S114). If the update process completion flag is set to false (YES in step S114), the backup apparatus 10 executes the process of updating the sequential entry count while at the same time setting the update process completion flag to true without clearing the continuing sequential entry count (step S115).

Effects of First Embodiment

As described above, the sequential entry count information indicating the number of sequential entries of the physical LBA is set in the LBA conversion table 14c by the backup apparatus 10. Then, the backup apparatus 10, upon receiving a read request, reads the sequential entry count information set in the entry of the LBA conversion table 14c corresponding to the leading logical LBA among the logical LBAs requested to be read and the entry of the LBA conversion table 14c. After that, in accordance with the read sequential entry count information, the backup apparatus 10 reads the physical volume corresponding to the sequential physical LBA. As a result, the backup apparatus 10, by setting only one entry of the LBA conversion table 14c corresponding to the leading logical LBA as an entry to be read, prevents the I/O for other areas from being excluded, with the result that the data access time may be shortened while at the same time reducing waiting for exclusion at the time of data access.

Also, according to the first embodiment, the backup apparatus 10 determines whether the logical LBA assigned last makes up a sequence with the logical LBA presently assigned to the LBA conversion table 14c or not. If the logical LBA assigned last makes up a sequence with the logical LBA presently assigned to the LBA conversion table 14c, the sequential entry count information is set as a sequence of the physical LBA corresponding to the logical LBA assigned last with the physical LBA corresponding to the logical LBA presently assigned to the LBA conversion table. As a result, the backup apparatus 10 may set the sequential entry count information appropriately.

Also, according to the first embodiment, if no new assignment of the LBA conversion table occurs within a certain time, the backup apparatus 10 determines whether the logical LBA assigned last makes up a sequence with the logical LBA presently assigned to the LBA conversion table 14c or not. If the logical LBA assigned last makes up a sequence with the logical LBA presently assigned to the LBA conversion table 14c, the backup apparatus 10 updates the sequential entry count information as a sequence of the physical LBA corresponding to the last assigned logical LBA with the physical LBA corresponding to the logical LBA presently assigned to the LBA conversion table 14c. As a result, even in the case of a sequential I/O divided by a plurality of I/Os, for example, the backup apparatus 10 may set the sequential entry count information as a sequential physical LBA. Thus, the sequential entry count information may be accurately set.

Also, according to the first embodiment, the backup apparatus 10, upon reception of a read request for the logical LBA for which the sequential entry count information is yet to be completely set, reads the physical volume as a sequence up to the logical LBA last assigned to the LBA conversion table 14c. As a result, the backup apparatus 10 may reduce waiting for the exclusion of the data access even in the read operation of the area for which the sequential entry count information is yet to be completely set.

Embodiment 2

An embodiment of the invention is explained above, and the invention may be embodied in various forms other than the embodiment described above. Now, another embodiment of the invention is described below as a second embodiment.
(1) System Configuration, etc.

Each component element of each device illustrated in the drawings is conceptual in function and not necessarily required to be configured physically as illustrated. The specific form of distribution and integration of the devices is not limited to the illustrated configurations, but the devices may be wholly or partly distributed or integrated in an arbitrary unit physically or functionally in accordance with the various loads or operating conditions. For example, the write control unit 13a and the read control unit 13e may be integrated with each other. Further, the whole or an arbitrary part of each processing function executed in each device may be realized as a CPU or a program analyzed in a CPU or hardware based on the wired logic.

Also, in the aforementioned embodiments, all or a part of the processes explained as automatically executable may be executed manually. Conversely, all or a part of the processes explained above as manually executable may be automatically executed by a well-known method. Also, the processing steps, the control steps, the specific names, and the information including various data and parameters described in the specification or illustrated in the drawings may be changed arbitrarily unless otherwise specified.

(2) Program

Figure 8:
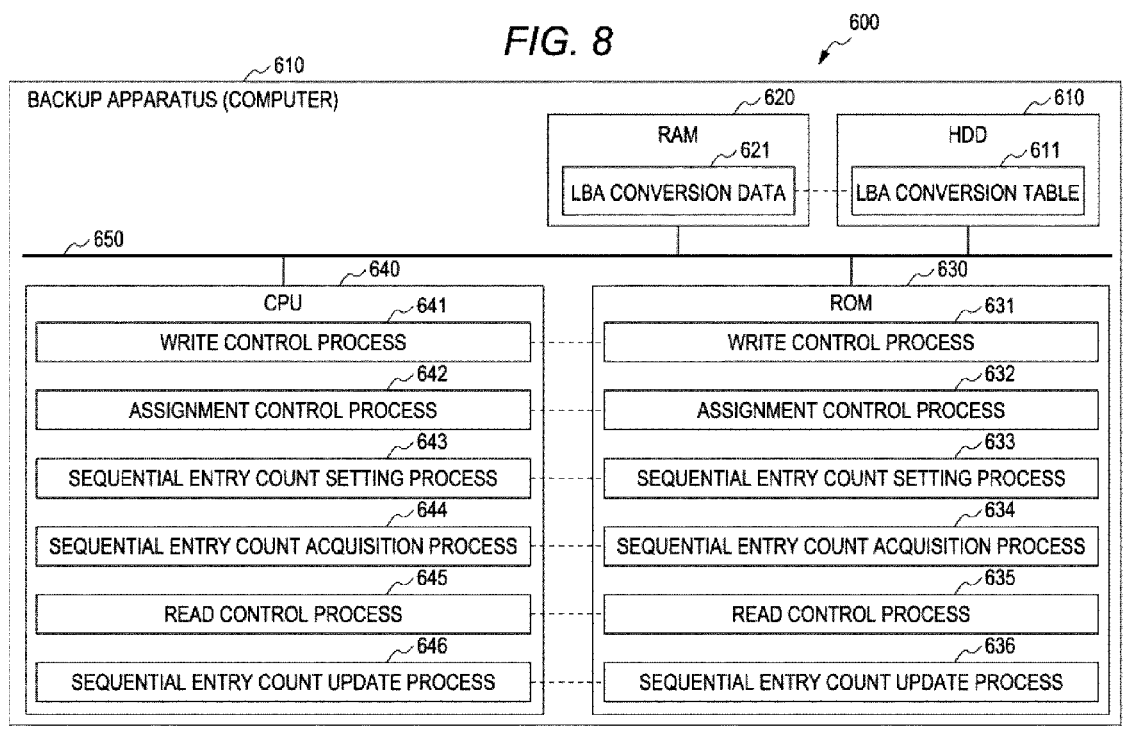
FIG. 8 is a diagram illustrating a computer for executing the backup program.
Figure 9:
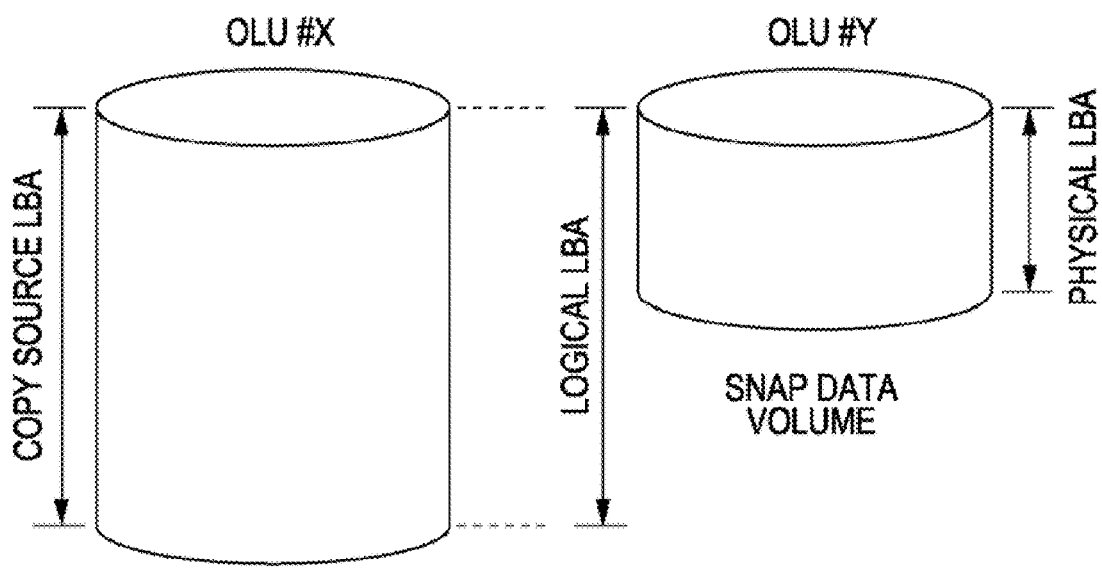
FIG. 9 is a diagram for explaining the prior art.
Figure 10:
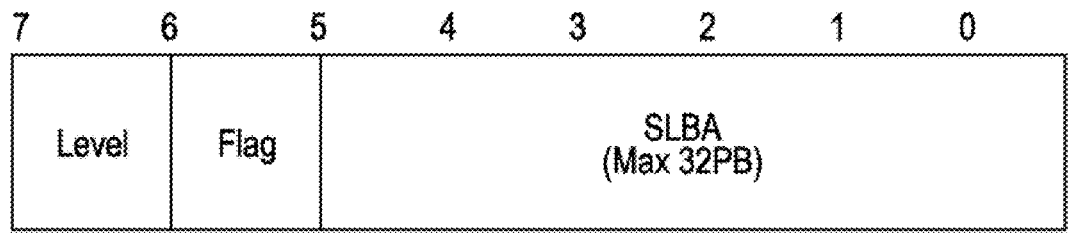
FIG. 10 is a diagram for explaining the prior art.
Figure 11:
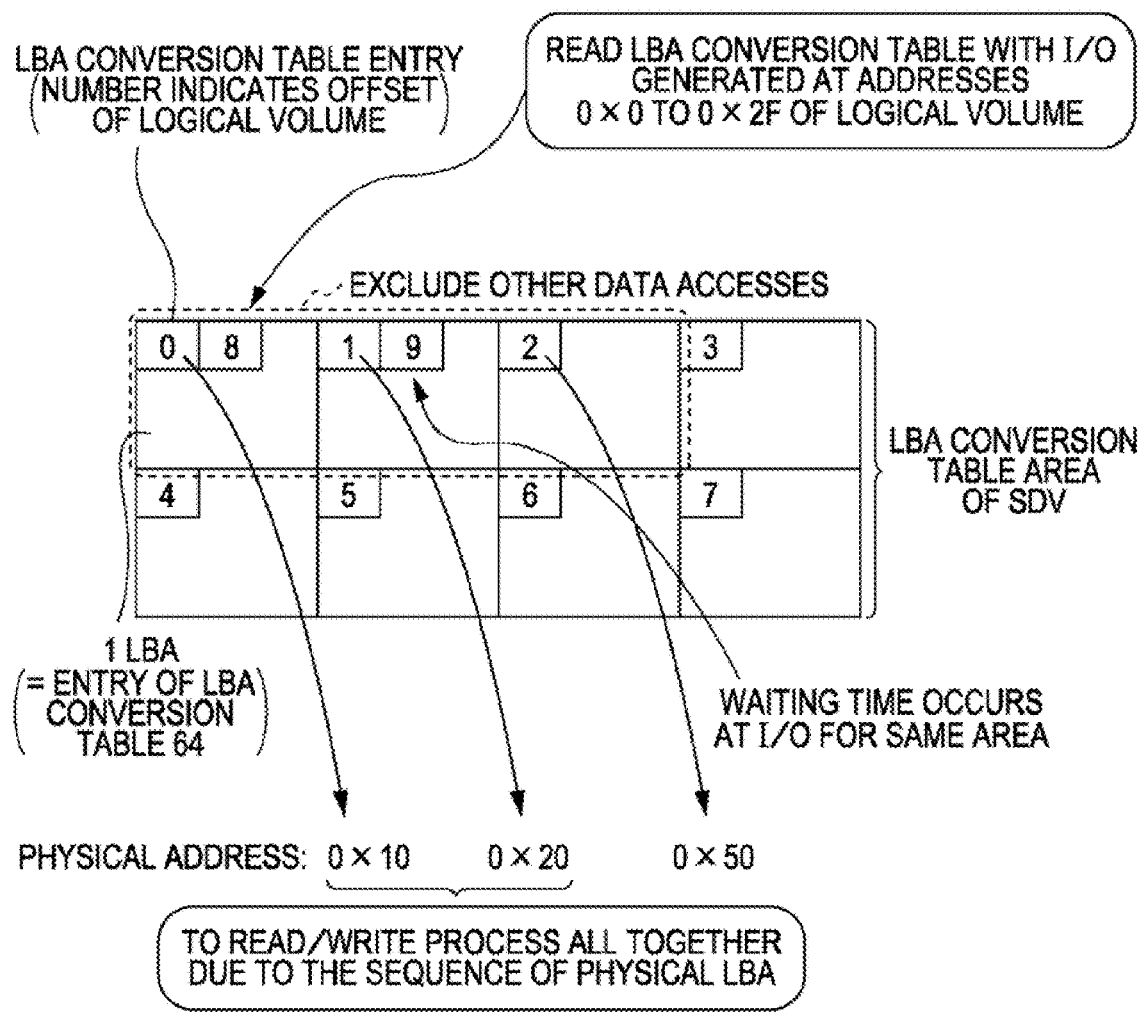
FIG. 11 is a diagram for explaining the prior art.

The various processes described above in the embodiments may be realized by executing a previously prepared program on the computer. With reference to FIG. 8, an example of the computer for executing a program having a similar function to the aforementioned embodiments is explained. FIG. 8 is a diagram illustrating a computer for executing the backup program.

As illustrated in FIG. 8, the computer 600 as a backup apparatus includes a HDD 610, a RAM 620, a ROM 630, and a CPU 640 interconnected by a bus 650.

The ROM 630 has stored therein the backup programs to exhibit similar functions to the embodiments described above, as illustrated in FIG. 8, a write control program 631, an assignment control program 632, a sequential entry count setting program 633, a sequential entry count acquisition program 634, a read control program 635, and a sequential entry count update program 636. The programs 631 to 636, like the component elements of the backup apparatus 10 illustrated in FIG. 1, may be integrated or distributed appropriately.

The CPU 640 reads and executes the programs 631 to 636 from the ROM 630, so that as illustrated in FIG. 8, the programs 631 to 636 function as a write control process 641, an assignment control process 642, a sequential entry count setting process 643, a sequential entry count acquisition process 644, a read control process 645, and a sequential entry count update process 646, respectively. The processes 641 to 646 correspond to the write control unit 13a, the assignment control unit 13b, the sequential entry count setting unit 13c, the sequential entry count acquisition unit 13d, the read control unit 13e, and the sequential entry count update unit 13f illustrated in FIG. 1, respectively.

Also, the HDD 610 has a LBA conversion table 611 as illustrated in FIG. 8. The LBA conversion table 611 corresponds to the LBA conversion table 14c illustrated in FIG. 1. The CPU 640 registers the data in the LBA conversion table 611, and by reading the LBA conversion data 621 from the LBA conversion table 611 and storing it in the RAM 620, executes the process based on the LBA conversion data 621 stored in the RAM 620.

The disclosed apparatus reads the physical volume corresponding to the sequential physical LBA in accordance with the sequential entry count information, and therefore, is improved to such a degree that the disclosed apparatus is able to manage a large physical LBA range with a single entry of the LBA conversion table, thereby producing the effect of reducing the waiting for exclusion of the data access.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A backup apparatus comprising:
a memory to store a logical address designated by a host system and a physical address indicating a data storage position in a copy destination volume in correspondence with each other, and
a processor to execute a process including:
setting sequential address count information in the memory, the sequential address count information indicating the number of physical addresses in a sequence;
upon receiving a read request, reading the physical address in the memory corresponding to a leading logical address among the logical addresses requested to be read, and acquiring the sequential address count information set in the memory; and
reading a physical volume corresponding to the physical addresses in a sequence in accordance with the sequential address count information acquired,
the setting the sequential address count information includes:
when a last assigned logical address to the memory and a logical address presently assigned to the memory make up a sequence, setting the sequential address count information as a sequence of the physical address corresponding to the last assigned logical address to the memory and the physical address corresponding to the logical address presently assigned to the memory.

2. The backup apparatus according to claim 1, wherein the process further including:
when no new assignment of the memory occurs within a certain time and when a last assigned logical address to the memory and a logical address presently assigned to the memory make up a sequence, updating the sequential address count information as a sequence of the physical address corresponding to the last assigned logical address to the memory and the physical address corresponding to the logical address presently assigned to the memory.

3. The backup apparatus according to claim 1, wherein reading a physical volume includes:
when a request is received to read a logical address whose sequential address count information is not yet set, reading the physical volume that is a sequence of physical addresses up to the physical address last assigned to the memory.

4. A backup method using a memory to store, in correspondence with each other, a logical address designated by a host system and a physical address indicating a data storage position in a copy destination volume, the method comprising:
setting sequential address count information indicating the number of physical addresses in a sequence;
reading the physical address, upon receiving a read request, in the memory corresponding to a leading logical address among the logical addresses requested to be read, and acquiring the sequential address count information set in the memory; and
reading a physical volume corresponding to the physical addresses in a sequence in accordance with the sequential address count information acquired,
when the last assigned logical address to the memory and the logical address presently assigned to the memory make up a sequence, setting the sequential address count information as a sequence of the physical address corresponding to the last assigned logical address to the memory and the physical address corresponding to the logical address presently assigned to the memory.

5. The method according to claim 4, further comprising, when no new assignment of the memory occurs within a certain time and when a last assigned logical address to the memory and a logical address presently assigned to the memory make up a sequence, updating the sequential address count information as a sequence of the physical address corresponding to the last assigned logical address to the memory and the physical address corresponding to the logical address presently assigned to the memory.

6. The method according to claim 4, comprising, when a request to read a logical address whose sequential address count information to be set in the sequential data count setting is not yet set is received, reading a physical volume that is a sequence of physical addresses up to the physical address last assigned to the memory.

7. A computer-readable recording medium encoded with a backup program using a memory to store, in correspondence with each other, a logical address designated by a host system and a physical address indicating a data storage position in a copy destination volume, and containing instructions executable on a processor, the program causing the processor to execute:

setting, in the memory, sequential address count information indicating the number of the physical addresses in a sequence;

reading the physical address, upon receiving a read request, corresponding to a leading logical address among the logical addresses requested to be read, and acquiring the sequential address count information set in the memory; and reading a physical volume corresponding to physical addresses in a sequence in accordance with the sequential address count information acquired, when the last assigned logical address to the memory and the logical address presently assigned to the memory make up a sequence, the sequential address count information is set as a sequence of the physical address corresponding to the last assigned logical address to the memory and the physical address corresponding to the logical address presently assigned to the memory.

8. The computer-readable recording medium according to claim 7, further comprising, when no new assignment of the memory occurs within a certain time and when the last assigned logical address to the memory and the logical address presently assigned to the memory make up a sequence, updating the sequential address count information as a sequence of the physical address corresponding to the last assigned logical address to the memory and the physical address corresponding to the logical address presently assigned to the memory.

9. The computer-readable recording medium according to claim 7, comprising, when a request to read a logical address whose sequential address count information to be set in the sequential data count setting is not yet set is received, reading a physical volume that is a sequence of physical addresses up to the physical address last assigned to the memory.

* * * * *